United States Patent [19]

Granger, Jr.

[11] 4,217,739

[45] Aug. 19, 1980

[54] GRAIN STORAGE BIN AND METHOD OF MAKING AND USING THE SAME

[76] Inventor: Jim G. Granger, Jr., Box 962, Fort Benton, Mont.

[21] Appl. No.: 893,933

[22] Filed: Apr. 6, 1978

[51] Int. Cl.³ .............................................. E04H 7/22
[52] U.S. Cl. ...................................... 52/197; 52/169.7
[58] Field of Search ............... 52/197, 169.7, 192–196, 52/245–249; 405/53, 55; 222/251, 256

[56] References Cited

U.S. PATENT DOCUMENTS

| | | |
|---|---|---|
| Re. 25,199 | 7/1962 | Brownell . |
| 234,185 | 11/1880 | Hendrick ........................... 405/55 X |
| 1,542,188 | 6/1925 | Tanner .................................... 52/197 |
| 2,232,439 | 2/1941 | Connor . |
| 2,724,151 | 11/1955 | Stack ...................................... 52/262 |
| 3,058,623 | 10/1962 | Hawk et al. . |
| 3,415,022 | 12/1968 | Schaefer et al. . |
| 3,444,659 | 5/1969 | Shanni . |
| 3,478,370 | 11/1969 | Stern et al. . |
| 3,685,232 | 8/1972 | Steffen ............................... 52/245 X |
| 3,736,754 | 6/1973 | Azalbert et al. ...................... 405/53 |
| 3,841,041 | 10/1974 | Riedland et al. . |
| 3,921,351 | 11/1975 | Johnson ................................. 52/197 |
| 3,943,721 | 3/1976 | Azalbert et al. ................... 405/53 X |
| 4,015,384 | 4/1977 | Barry ................................ 405/55 X |
| 4,040,218 | 8/1977 | Stanelle ............................. 52/245 X |

FOREIGN PATENT DOCUMENTS

1930587 12/1970 Fed. Rep. of Germany .

*Primary Examiner*—J. Karl Bell
*Attorney, Agent, or Firm*—Lane, Aitken, Ziems, Kice & Kananen

[57] ABSTRACT

A storage bin is disclosed for storing a flowable material such as an agricultural commodity in a water-impermeable environment which is particularly suited for the storage of grain. The bin includes a liquid impervious, preferably cone-shaped, integral liner supported substantially and entirely by a cavity in the ground adjacent to and beneath the liner. A foundation, which includes a footing supported by the ground adjacent the footing, is located relative to the liner so that an upper lip portion of the liner is secured to the footing. An above ground storage portion of the bin is directly secured to the footing so that the bin construction eliminates the cost of material in steel hopper bottom and concrete hopper bottom bins. A hopper for receiving material and directing it to an unloading auger within the bin is located at the apex portion of the inverted cone-shaped liner. A method of constructing a storage bin of the type described is also disclosed.

10 Claims, 4 Drawing Figures

GRAIN STORAGE BIN AND METHOD OF MAKING AND USING THE SAME

BACKGROUND OF THE INVENTION

This invention relates to storage bins for storing a flowable material, which may include, for example, an agricultural commodity such as grain; or other free-flowing materials such as fertilizers or cement. More particularly, this invention relates to a storage bin for storing grain in a water-impermeable environment wherein the grain bin includes a liquid impervious, perferably cone-shaped integral liner supported substantially entirely by a cavity in the ground adjacent to and beneath the liner. Still more particularly, this invention relates to a method for constructing a grain storage bin of the type described.

Grain crops, such as wheat, corn, oats and the like, have been cultivated for millenniums. The grain, in addition to its value as a foodstuff and its ease of cultivation, can be stored, under proper conditions, for long periods of time without deterioration. For proper storage, however, the grain must be placed in a storage facility which is designed to protect the grain from moisture and insects. It is especially important that the storage facility maintain the grain at a preferred moisture level, such as 10-12%, since insect activity, mold growth, and rot become significant problems at moisture levels above the preferred range. In addition, excess moisture can induce undesirable exothermic reactions in the stored grain.

The problem of grain storage has been highlighted recently because advances in grain growing techniques and equipment have produced grain harvests which have greatly exceeded existing storage capacity. Consequently, a need has arisen to increase storage capability with a minimum increase in cost.

In the past, two types of storage facilities, the steel hopper bin and the flat concrete floor bin, have mainly been used for the storage of grain. While both types of bin structures are adequate for the storage and handling of grain, they both have a number of disadvantages inherent in their respective designs.

The steel hopper bin is generally positioned above the ground surface and supported by a truss and brace system of steel beams designed to carry the weight of the bin and the stored grain. The bin, which may include a conical bottom, can be designed such that the grain can flow to a central portion for convenient removal by, for example, an unloading auger. While steel hopper bins function efficiently in the storage and unloading of grain, they are relatively expensive because of the amount of support steel required and the cost of labor needed to erect the bin. As a consequence of this cost disadvantage, steel hopper bins are beyond the financial ability of many grain farmers.

The flat floor bin structure is generally supported on the ground and, as the name implies, has a flat concrete floor upon which the grain is stored. The flat floor bin enjoys a significant advantage over the steel hopper bin in that the cost of material and construction is considerably less. However, the flat floor requires that the grain be removed from the bin by either manual labor or by mechanized means, both of which have disadvantages. Manual removal of the grain, for example, by shoveling, involves the cost of labor; the uncertainty of obtaining workmen when needed for an unpleasant, dirty job; and the exposure of the workmen to a dusty, dirty and/or moldy bin environment. Exposure to the dust and/or mold in a grain bin can cause an increase in sensitivity to the dust with repeated exposure and serious illness. Mechanized removal of the grain requires an investment in a bin sweeping apparatus and the labor cost of an operator. Mechanized bin sweeps pose a substantial injury risk to the sweep operator with the attendant rise in insurance costs and the risk of liability for injuries. As in the case of the manual removal of the grain, the bin sweep operator is exposed to the same health hazards posed by the inhalation of grain dust and/or mold.

In addition to the problems associated with the removal of the grain from the flat floor bin, the concrete floor, as with most concrete structures, is subject to minute cracking which can allow moisture into the grain. This moisture, as indicated above, can cause grain deterioration, an increase in insect activity, and undesirable exothermic reactions.

Consequently, it is an overall object of the present invention to provide a grain bin structure and method therefor which will store grain under desirable storage conditions and which overcomes the disadvantages of the prior grain storage structures.

It is an object of this invention to provide a liquid-impervious grain storage bin which is largely supported by the ground beneath and adjacent to the bin.

It is an additional object of this invention to provide a grain storage bin which utilizes a liquid-impervious preferably conically-shaped integral liner supported substantially entirely by a cavity in the ground adjacent to and beneath the liner.

It is a further object of this invention to construct a storage bin construction wherein an above ground portion of the storage bin is supported by a foundation which includes a footing supported by the ground and the below ground portion of the storage bin is also supported by the footing as well as by an identically-shaped cavity formed within the ground.

These and other objects of the invention will become apparent in a review of the following written description of the invention taken in conjunction with the accompanying drawings.

SUMMARY OF THE INVENTION

Directed to achieving the afore-stated objects of this invention and resolving the deficiencies in the art, this invention relates in one aspect to a method of constructing a storage bin for storing a flowable material such as grain. The method includes the steps of constructing a foundation which includes a footing supported by the ground. In a preferred embodiment, the footing is substantially continuous, is positioned at about the surface level of the ground, and assumes the shape of the above-ground portion of the storage bin. For example, the footing is preferably circular for accommodating a cylindrical, above-ground storage bin having a circular cross section. An outwardly-opening cavity is excavated in the ground adjacent to the footing and subsequently shaped to receive a liquid-impervious integral liner below the ground surface level and within the cavity and substantially adjacent to the cavity. While the ground may be shaped identically in shape to the liner, for example, in a conical configuration, any interstitial space between the liner and the ground is backfilled so that by either construction the liner is substantially supported by the ground or the interstitial material. Preferably, the liner material is any liquid-blocking barrier liner material such as glass fibers impregnated with a suitable binding resin, plastic, elastomeric material, and the like. It is desirable that the material chosen exhibit sufficient tensile strength to act as a barrier to liquid when the bin is loaded under the described conditions. By "liquid-blocking" in this context, it is intended to mean that a passage of fluid through the barrier liner is either blocked completely or is less than an acceptable predetermined quantity which varies with the liquid tolerance of the particular material stored in the bin. For grain, the liquid permeability will of necessity be at or quite near to zero. In addition to the aforementioned materials, metals such as steel could also be used.

After the liner is positioned within the cavity as described, the liner is secured to the footing. Thereafter, the above-ground portion of the storage bin is also secured to the footing in a fluid impervious manner to provide a watertight storage bin.

The invention in a second aspect is a combination of the foundation, liner, and storage bin as described. The storage bin may also include a hopper disposed near the truncated apex portion of the inverted conical liner for receiving the inlet opening of an unloading auger located in a position substantially parallel to the upward sloping side of the cone-shaped liner.

The footing construction is arranged to conveniently receive in a secure relationship an upwardly extending lip or portion of the conical liner such as by anchor bolts secured within concrete footing.

Another surface of the concrete footing includes an anchor bolt for receiving a bin tie-down plate for securing the bin to the footing. The interior surface of the bin may be secured to the footing by grouting or by concrete to achieve a watertight connection.

DETAILED DESCRIPTION OF THE PREFERRED EMBODIMENT

Figure 1:
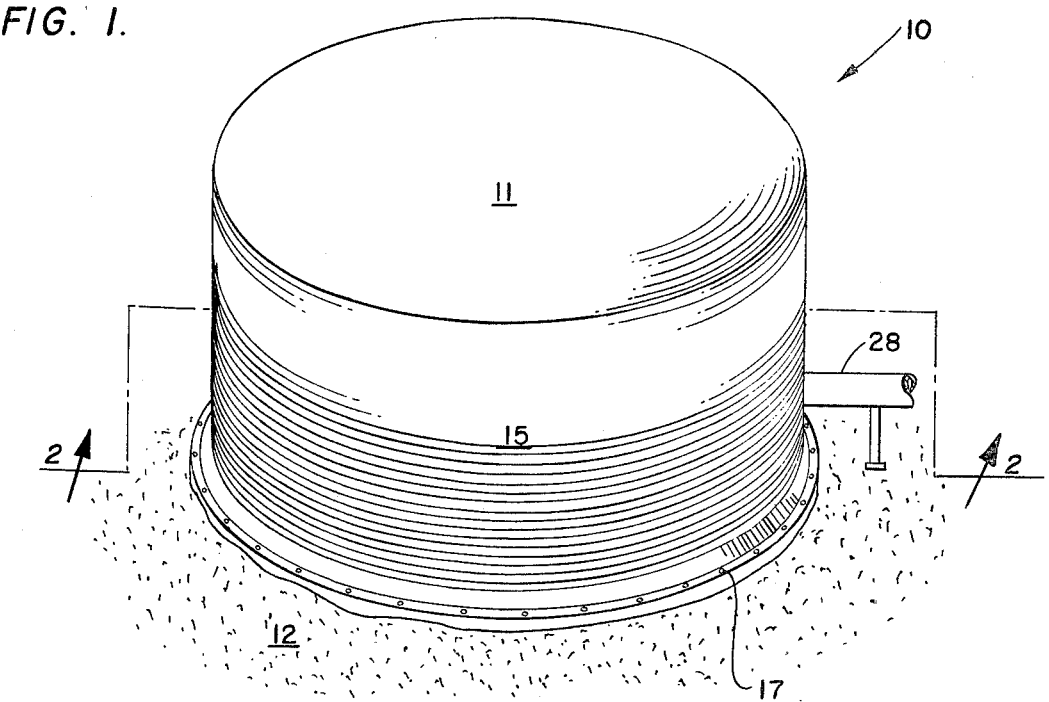
FIG. 1 is a perspective view of the above-ground portion of the storage bin according to the invention showing the exit end of the material-unloading end of the auger tube and the bin secured to the footing in a fluid-tight relationship.
Figure 2:
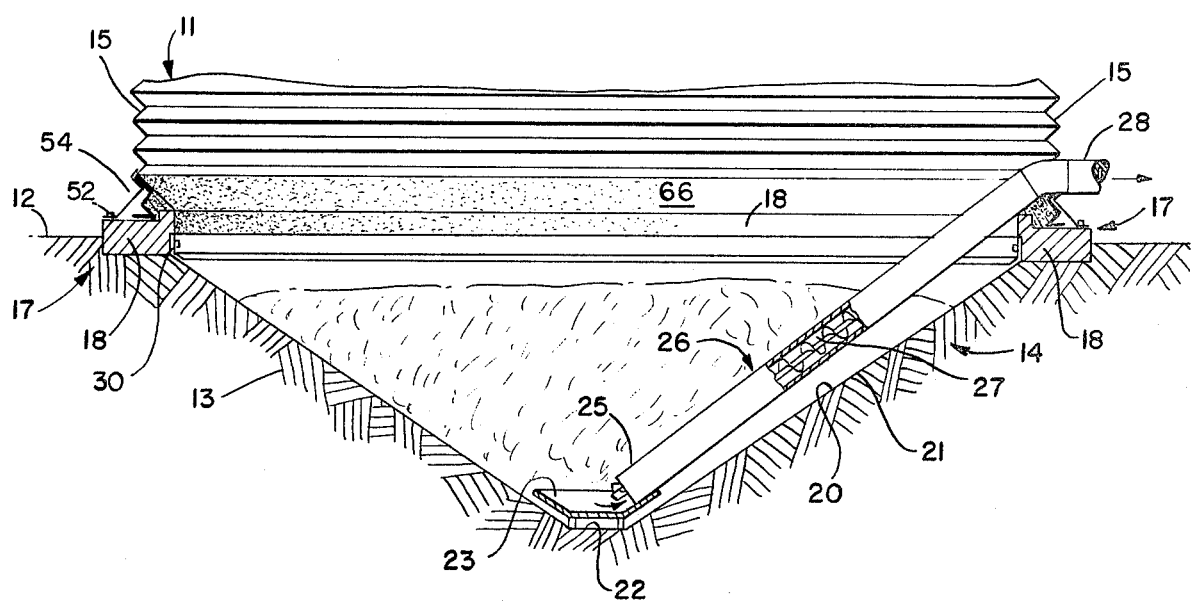
FIG. 2 is a side cross-sectional view, taken along line 2—2 of FIG. 1, showing an inverted conically-shaped liquid-impermeable cone liner according to the invention supported substantially entirely by the ground and containing near its truncated apex a hopper for receiving the inlet end of an unloading auger for withdrawing grain from the bin.

In FIGS. 1 and 2, a storage bin, designated generally by the reference numeral 10, comprises a portion 11 located above the surface level 12 of the ground 13 and a portion 14 located below the surface level. The above-grade portion 11 comprises a generally cylindrical, rigid structure having a corrugated outer surface 15 having a suitable strength for storing a flowable material such as grain within the bin. The portion 11 may be made of metal or other suitable fluid impermeable material following known construction techniques. For example, a plurality of members may be connected to form the construction 11.

As best seen in FIG. 2, the bin 10 includes a foundation, designated generally by the reference numeral 17, which includes a footing 18 the top of which is located substantially above (6–8 in.) the ground surface level 12 and supported by the ground 13. An integral, inverted, fluid-impermeable liner 20 is positioned in a congruent cavity 21 in the ground 13 so that substantially the entire outer surface of the liner 20 is supported by the adjacent ground 13. The liner 20 is preferably generally conical having its apex truncated to form a surface 22 to receive a hopper 23 near the apex of the liner to receive the inlet end 25 of an unloading auger-tube 26 containing therein an unloading auger 27. The exit end 28 of the unloading auger is located on the outside of the bin 10 at a position convenient for receiving and transporting augered grain from the storage bin. The precise details of the unloading auger are within the skill of the art.

Figure 3:
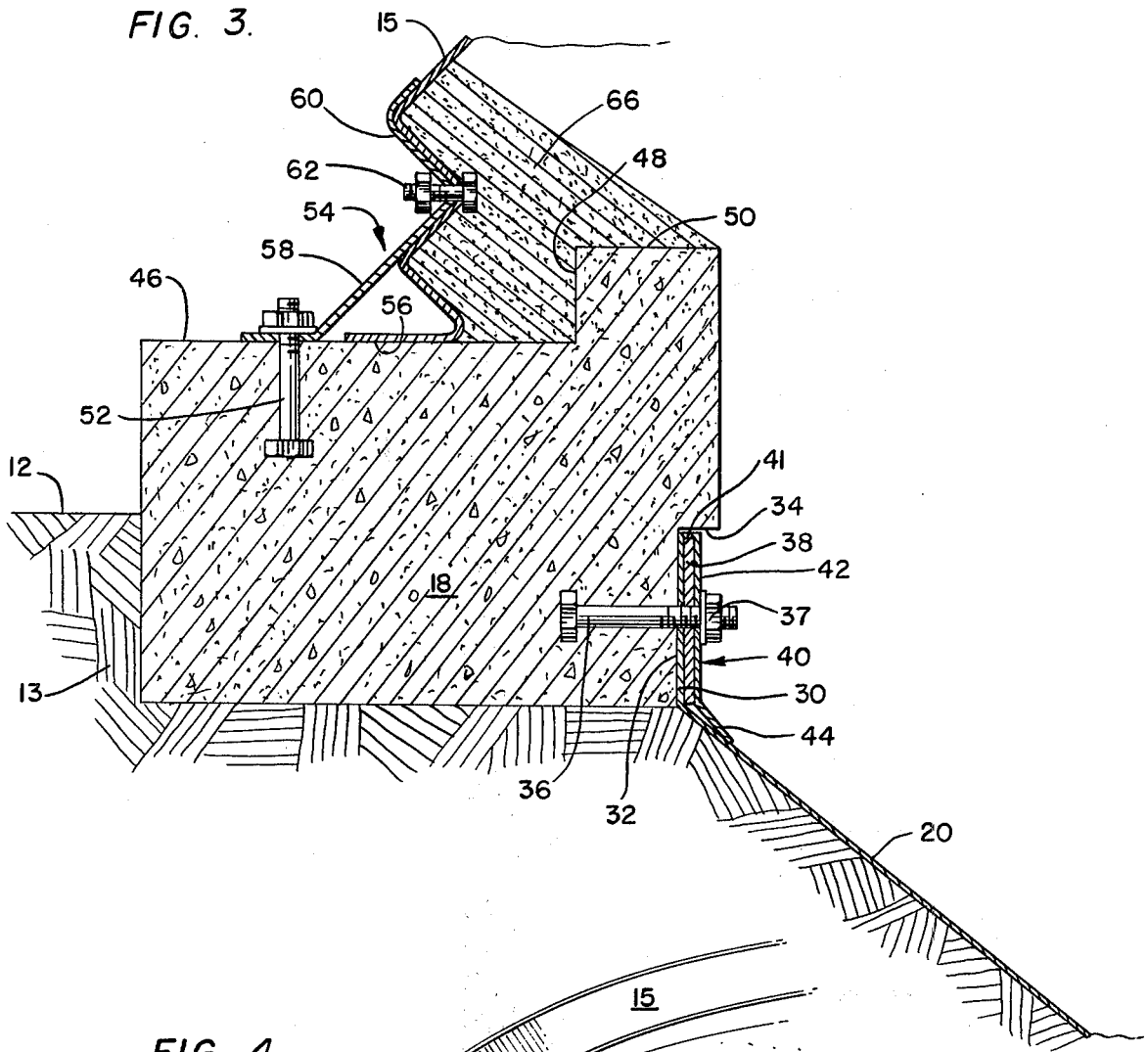
FIG. 3 is a side cross-sectional detailed view of the footing structure and a method for securing both the cone liner and the bin to the footing.

As best seen in FIGS. 2 and 3, the cone-shaped liner 20 has an upwardly-extending lip 30 about the circumference thereof to be received in a recess defined by the surfaces 32 and 34 of the continuous footing 18. An anchor bolt 36 is rigidly positioned in the concrete footing during forming for receiving a fastening nut 37 at its threaded end. The bolt 36 passes through a mating opening in the upper lip 30 of the liner. A backing plate 38 is located adjacent the lip 30 and is surrounded by a flange member 40 having a surface 41 generally parallel to the surface 34 of the recess, a downwardly-extending portion of the lip 42 generally parallel to the lip 30 of the liner 20 and the surface 32 of the recess, and an inclined portion 44 angled differently from the slope of the cone liner so that an end of the inclined portion 44 is in proximate contact with the inner surface of the cone-shaped liner 20. The structural arrangement thus described provides a watertight liquid-impervious seal for the inner portion of the storage bin and prevents entry of liquid into the liner.

The upper portion of the concrete footing 18 defines a surface 46, a surface 48, and a surface 50 arranged to form a stepped configuration. An anchor bolt 52 for receiving a bin tie-down member 54 is fitted in and is located during forming in the concrete footing 18. As seen, a base angle 56 of the above-ground portion 11 of the storage bin 10 rests on the surface 46 and is located so that the inclined portion 58 of the bin tie-down member 54 is configured at its end 60 to mate with the corrugations 15 of the portion 11. A tie bolt 62 secures the bin tie-down member 54 to the bin 10. By this construction, the space between the inner surface of the bin 10 and the surfaces 48 and 50 of the foundation may be filled with grout or concrete 66 to form a liquid-tight seal. The precise details of the corrugated base angle and bin tie-downs are within the skill of the art.

Figure 4:
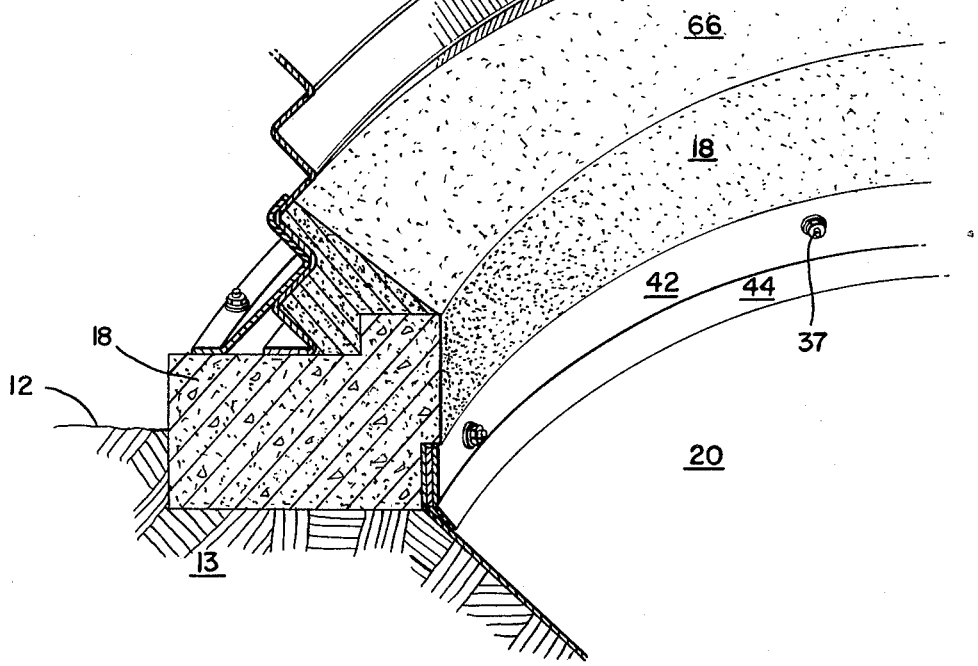
FIG. 4 is an interior partial perspective view of the watertight joint arrangement between the above-ground storage bin, the footing, and the cone liner mounted below ground surface level.

FIG. 4 is an inner perspective view of the composite construction thus described.

In order to construct the storage bin described in connection with FIGS. 1–4, the foundation 17 which includes the footing 18 supported by the ground 13 adjacent the footing is initially constructed. While individual footing members may be used, it is preferred that a continuous footing 18 in the shape of the grain bin (circular as shown) be constructed in order to facilitate sealing the connection between the upper portion 11 of the grain bin 10 and the footing 18 so that the interior of the bin will not receive fluid. In the alternative, other shapes can be used, for example, a rectangular storage bin and a waterproof liner having a rectangular cross section tapering downwardly and inwardly to a surface for receiving the hopper 23.

The cylindrical construction of the upper portion 11 of the bin 10 and the conical construction of the lower portion is preferred to facilitate transfer of the flowable material, such as grain, within the bin to the hopper 23. Thus, the preferred construction and the alternate construction take advantage of the flow characteristics of the grain to avoid the need for human labor within the bin as would be the case with flat bottom bin construction. In this respect, therefore, the use of bin sweeping equipment is avoided, the possibility of accident to operators with such equipment is eliminated, and the disposition of a human being in an environment exposed to dust and mold inhalation is also eliminated.

After the foundation 17 is constructed, an upwardly opening cavity 21 is excavated in the ground 13 adjacent to the footing 18 for receiving the cone-shaped liner 20. The cavity is preferable shaped to receive the liner within the cavity 21 in a position substantially adjacent thereto so that the liner 20 is in register with the cavity 21. Thereafter, the liner 20 is inserted into the cavity 21 so that the liner is substantially entirely supported by the ground adjacent the liner. Where the excavation of the cavity 21 and its subsequent shaping do not precisely and completely support the adjacent liner 20, backfill can be used as long as the backfill is tamped sufficiently to provide adequate support for the liner 20. In order to position the liner 20 in the cavity 21, it is desirable that the surface soil adjacent to the liner be free from sharp objects and foreign material to avoid rupturing the liner.

When so disposed, the liner 20 is then secured to the footing 18 by positioning the openings in the lip 30 of the liner 20 adjacent to the bolts 36 disposed in register therewith in the lower portion of the concrete footing 18. The backing plate 38 and the flange member 40 are then positioned over the bolt and nut spun on the bolt to secure the overall combination in a watertight relationship as described. Thereafter, the hopper 23 is installed and the unloading auger tube 26 together with the unloading auger 27 positioned within the bin as described. In the alternative, a trough could be located on top of the liner to guide the unloading auger down into the inverted cone formed by the waterproof liner 20 to prevent the auger from contacting and possibly damaging the liner.

As an alternative method of construction, the excavation and shaping of the cavity could be performed prior to the formation of the foundation 17.

After the foundation has been formed and the cone liner 21 secured thereto, the upper portion 11 of the bin 10 is positioned resting on the foundation 17 and the bin tie-down members 54 secured in the manner described in connection with FIG. 3.

The liner material can be constructed from any hard or cloth-like natural or man-made synthetic material such as the following materials, a combination of two materials, or laminations: plastics, glass fibers impregnated with resins, nylon, canvas, rubber, vinyl fabrics, polyvinyl or materials commercially available under the trademarks "Dacron," "Neoprene," "Fiberglas," "Hypalon," or any other commercially available materials, including steel.

The size of the concrete footing around the perimeter of the bin and internal reinforcement, if any, will be determined both by local conditions and perhaps local building codes. In a typical installation, it is anticipated that the footing will be about 18" inches wide and 12" inches deep and positioned relative to the surface or ground level so that the top of the liner is preferably above ground. With respect to the grouting material, in areas where the grout or concrete comes into contact with the metal, the metal should be painted with tar or similar material. Moreover, while the footing shown in FIGS. 3 and 4 is illustrated as having a stepped upper surface, the entire top surface 44 could be planar and the grouting in the interior of the bin placed thereon as described.

As can be seen from the above description, the grain storage bin and the method therefor provide a bin structure which overcomes a number of drawbacks and retains some of the advantageous features of the prior art structures. The use of a tough water-proof liner having a conical configuration supported by an in-the-ground cavity eliminates the concrete floor of the flat floor bin, with its disadvantageously flat surface and its susceptibility to cracking, and yet retains the desirable cone shape suited for mechanized unloading by an auger. Also, the substantial material and labor cost associated with the above ground steel hopper bins has been eliminated.

While the present invention has been described in terms of a storage bin for grain, it is apparent that it is equally suitable for the storage of any type of free-flowing material such as, but not limited to, fertilizer, cement, and the like.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. A method of constructing a storage bin for storing an agricultural commodity or other free-flowing solid material in a water-impermeable environment comprising the steps of:

constructing a foundation which includes a footing supported by the ground about the footing;

excavating an upwardly opening cavity in the ground adjacent the footing;

shaping the cavity to receive a liquid blocking barrier liner within the cavity and substantially adjacent thereto so that the liner is in register with the cavity;

inserting said liner into said cavity in an inverted orientation so that said liner is substantially entirely supported by the material adjacent to and outside of the liner;

sealing an upper lip portion of the liner to the footing to provide a fluid-tight seal; and securing an above ground storage portion of a storage bin to an upper portion of the footing so that said storage portion is positioned over the upper portion of the liner cavity, thereby to provide a storage bin having an upper portion and a lower lined portion for storing the agricultural commodity or material in a watertight structure supported substantially entirely by the footing which is supported by the ground; and providing means for extracting said commodity or material from said lined portion of said storage bin.

2. The method as set forth in claim 1 wherein the step of constructing a foundation is further defined in that said footing is substantially continuous and is circular in plan.

3. The method as set forth in claim 2 wherein the step of shaping is further defined in that the cavity in the ground is substantially conical to receive within the cavity a substantially conical liner.

4. The method of claim 3 wherein the shaping step is further defined in that the cavity is trimmed to nearly precisely the shape of the liner and any space between said liner and cavity is substantially entirely backfilled and packed so that substantially the entire outer surface of the liner is supported by the backfill and adjacent ground.

5. The method of claim 1 wherein the step of providing includes the step of installing an auger in communication with the apex area of the inverted cone-shaped liner and with the exterior of said bin to remove the flowable material from the liner.

6. The method of claim 1 further including the step of sealing the interior lower surface of the storage bin to said footing.

7. A storage bin for storing an agricultural commodity or other free-flowing material in a fluid impervious environment comprising the combination of:
 a liquid blocking shaped integral barrier liner supported substantially entirely by a cavity in the ground adjacent the liner;
 a foundation which includes a footing supported by the ground adjacent the footing;
 an upper lip portion on said liner;
 a recess in said footing for receiving said lip portion;
 means for securing said lip portion to said footing;
 a storage bin portion sealingly secured to another portion of the footing and supported thereby, whereby said commodity or free-flowing material is contained at least in said barrier liner portion of said storage bin; and
 means for extracting said commodity or material from said liner portion of said storage bin.

8. The storage bin as set forth in claim 1, wherein said footing is continuous and circular in plan, said liner is substantially conical and inverted within said cavity.

9. The storage bin as set forth in claim 7, further including a backing plate located adjacent said lip portion of said liner and a flange member located adjacent said backing plate for sealing the connection of said lip portion to said footing in a liquid impermeable manner.

10. The storage bin as set forth in claim 7, further including means for sealing said storage bin upper portion to said footing in a liquid impermeable manner.

* * * * *

UNITED STATES PATENT AND TRADEMARK OFFICE
CERTIFICATE OF CORRECTION

PATENT NO. : 4,217,739

DATED : August 19, 1980

INVENTOR(S) : JIM G. GRANGER, JR.

It is certified that error appears in the above—identified patent and that said Letters Patent is hereby corrected as shown below:

Column 8, line 19 (Claim 8, line 1), "1" should read -- 7 --.

Signed and Sealed this

Twenty-eighth Day of October 1980

[SEAL]

Attest:

SIDNEY A. DIAMOND

Attesting Officer

Commissioner of Patents and Trademarks